United States Patent [19]

Ingram, Jr. et al.

[11] 4,228,953
[45] Oct. 21, 1980

[54] DUAL BELT DRIVE

[75] Inventors: James R. Ingram, Jr., Dallas; George A. Kiesel, Irving, both of Tex.

[73] Assignee: Recognition Equipment Inc.

[21] Appl. No.: 960,209

[22] Filed: Nov. 13, 1978

[51] Int. Cl.² ............... G06K 13/07; G06K 13/18; B65G 47/24
[52] U.S. Cl. .................. 235/480; 198/626; 198/688; 235/475
[58] Field of Search .......... 235/475, 476, 477, 480, 235/481; 198/626, 627, 628, 688

[56] References Cited

U.S. PATENT DOCUMENTS

| 3,025,771 | 3/1962 | Uchida | 235/475 |
| 3,838,771 | 10/1974 | Whiteford | 198/626 |

Primary Examiner—Daryl W. Cook

[57] ABSTRACT

A dual belt drive for use in a document transport using two belts having teeth thereon which mesh to lock a document in place. The belt is spring loaded to compensate for documents of various thickness.

4 Claims, 5 Drawing Figures

DUAL BELT DRIVE

BACKGROUND OF THE INVENTION

This invention relates to document transport and more particularly to a dual belt drive for such a transport in which the belts have teeth which mesh to hold the document in place.

DESCRIPTION OF THE PRIOR ART

Document Feed Mechanisms usually are comprised of belts and rollers. However, belts thereon are generally smooth or at the most textured surfaces between which a document may move. For example, dual belts may be used between which documents move or a belt and a guide fence or rollers. However, the thickness or bulkiness of the document may cause the document to slip and therefore its exact position may not be known. This is at times critical where printing and reading from the document is to be done at a known location on the document.

SUMMARY OF THE INVENTION

Dual belts are used on a compact transport. One of the belts is a driven belt using a timing pulley which gives a positive drive and with the opposite belt, an idler, with its teeth in mesh with the drive belt. Pulleys on the extreme end of the idler belt are hard mounted while the internal pulleys are spring loaded to allow passage of the paper or card stock. As papers move between the belts, the belts part and as the paper passes each pulley, the pulley being spring loaded, returns the belt to mesh condition with the driven belt continuing to drive the complete system while holding the document in a fixed position.

The foregoing and other features and technical advance of the invention will be apparent from the following detailed description of a preferred embodiment of the invention as illustrated in the accompanying drawings.

Figure 1:
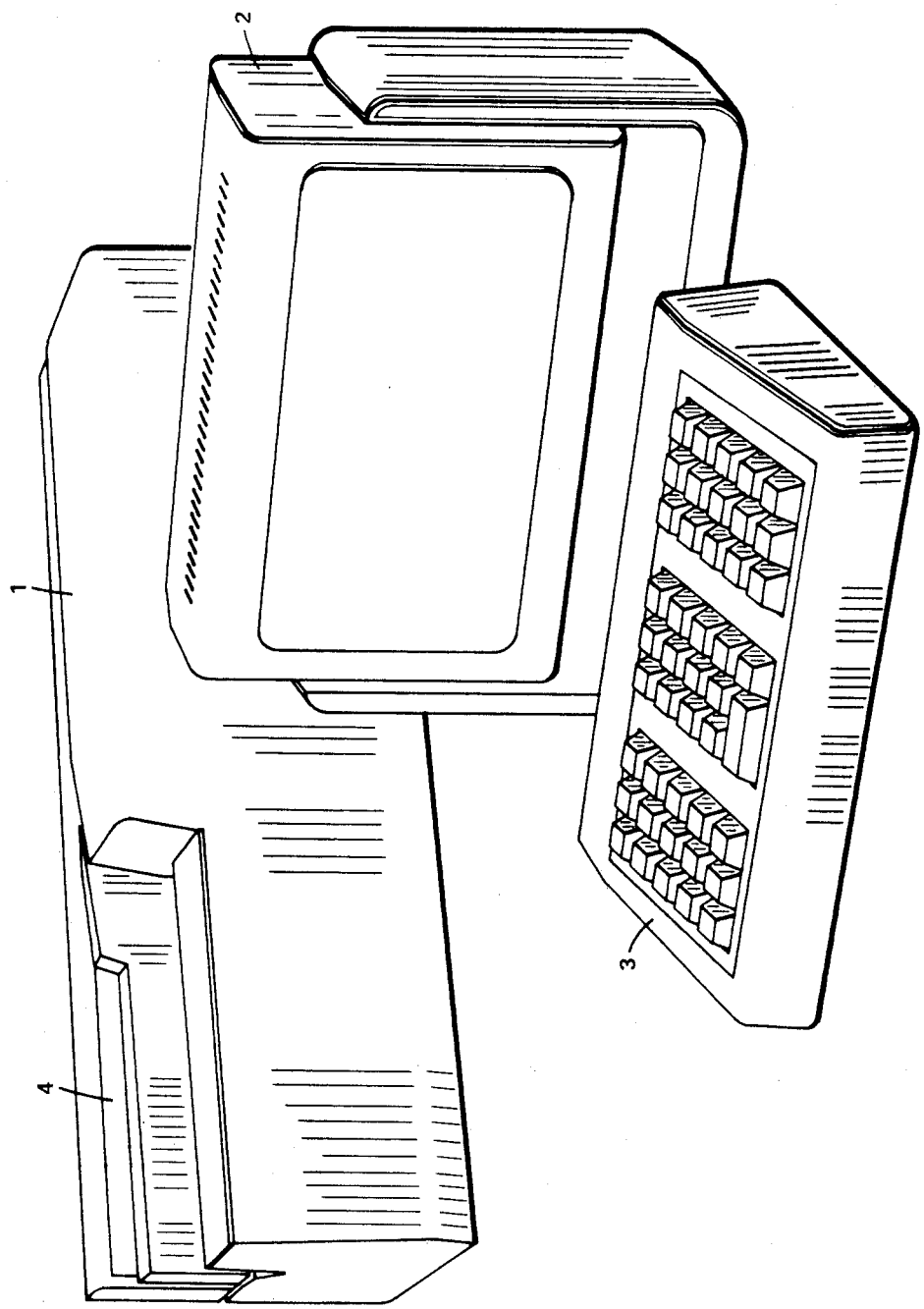
FIG. 1 is a pictorial representation of a document transport, keyboard and display.

Looking at FIG. 1, there is an illustrated pictorial representation of the compact transport 1 used in conjunction with a display 2 and a keyboard 3 which may be used as a bank teller station. A check is deposited in the transport at 4 and the teller can key the amount of the check into the keyboard which will cause the amount thereof to be printed on the check by the printer. The information read or input into the system is shown on the display. The information read from the check and input by the teller is relayed to a central data bank where the information is stored for future use.

Figure 2:
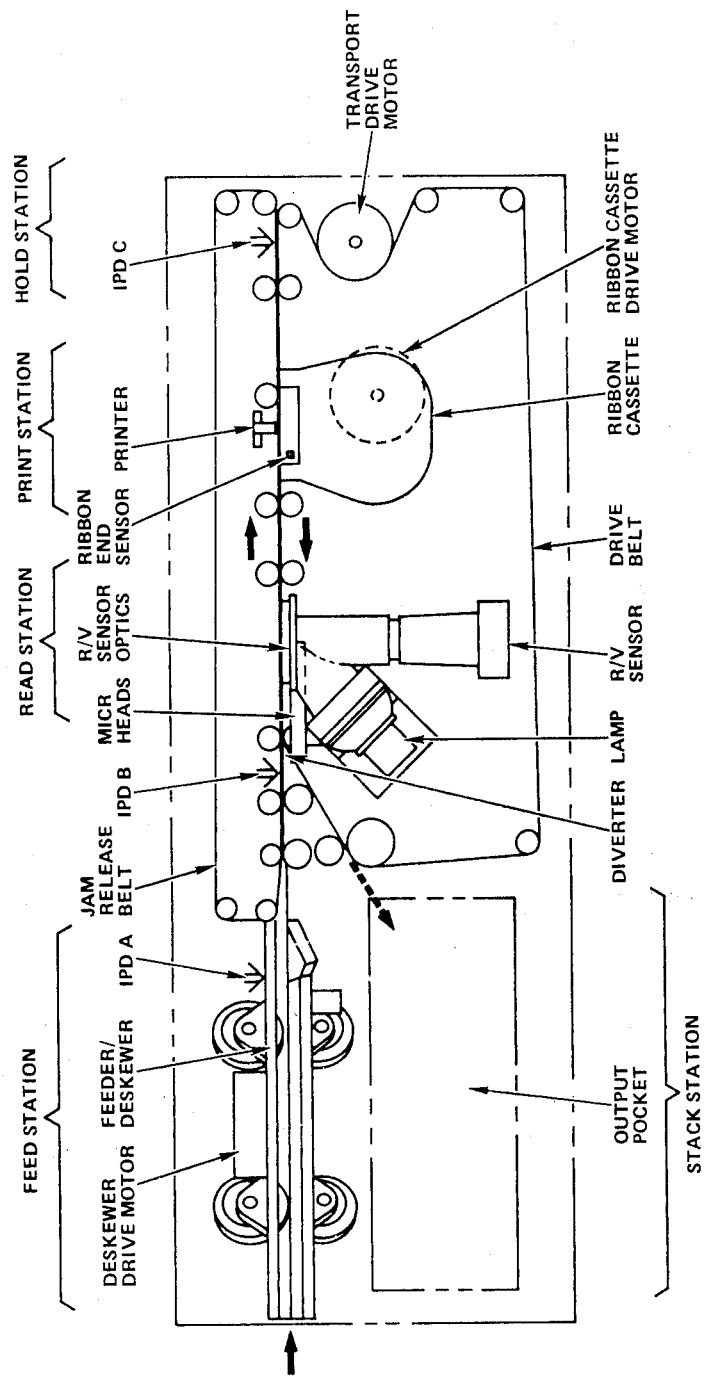
FIG. 2 is an illustration of the functional parts of the transport.

FIG. 2 is a representation of the functional portions of the transport showing the various stations and devices within the transport which are actuated by a document being processed through the transport.

As a document is dropped into the feeder, it is sensed by an item presence detector (IPD) at the bottom of the feeder throat. The document is deskewed and advanced forward to the transport belts.

Acting on a timed signal from the feeder IPD, the transport drive motor is initiated and the belts move in a clockwise or left to right mode. The document is pinched between the jam release belt (idler belt) and the pinch roller as the belts accelerate up to a constant speed of 25 in/sec.

Just prior to the read station, the jam release belt engages the drive belt and the leading edge of the document is sensed by a second IPD. This IPD starts a timing clock which tells the down range IPD (No. 3) when to expect the document.

The document passes the read station at constant speed where both magnetic ink characters and bar code lines (if present) are read.

The MICR reader is located directly below the bar code reader where it reads the E13B formatted information. E13B is the designation of the Magnetic Ink Character usually found on checks. The information is read and sent to storage external to the transport.

If the document has been previously encoded with bar code information, the bar code reader reads and stores it. If there exists no information on the bar code line (approximately 2.125 above document bottom), it is recognized as such and the document proceeds down the belt path.

The document continues to the right, beyond the printer until the leading edge trips the third IPD which is expecting it. If the document fails to reach the third IPD within the expected time, a jam condition is indicated and the belts are stopped. After passing the third IPD, the drive motor stops momentarily and its direction is automatically reversed.

The next operation to be performed is printing. If one field (15 characters) or less is to be printed, the motor will ramp up to the printing position and then start the stepping sequence. If printing between 16 and 27 characters, the drive motor steps immediately as if it were printing.

As the document passes through the print station, it is encoded with a CFC-6 format (as described in U.S. patent application Ser. No. 854,954 filed Nov. 25, 1977) with a fluorescent ink which is transferred from the ¼ inch ribbon in the cassette. After each impact of the hammer, the belts reposition the document at the precise location for the next impact while the print wheel motor repositions the print wheel for the next character.

After the last printed character, the drive motor ramps up to a constant speed of 25 in./sec. and moves the document past the read station. In this mode, the bar code reader acts as a validator to verify that the printer has properly encoded the document.

After passing through the validate station, the document is gated away from the main belt path to the stacker pocket where it is deflected and gravity stacked. As the trailing edge of the processed document passes the second IPD, the transport motor is altered and the sequence may start again.

Figure 3A:
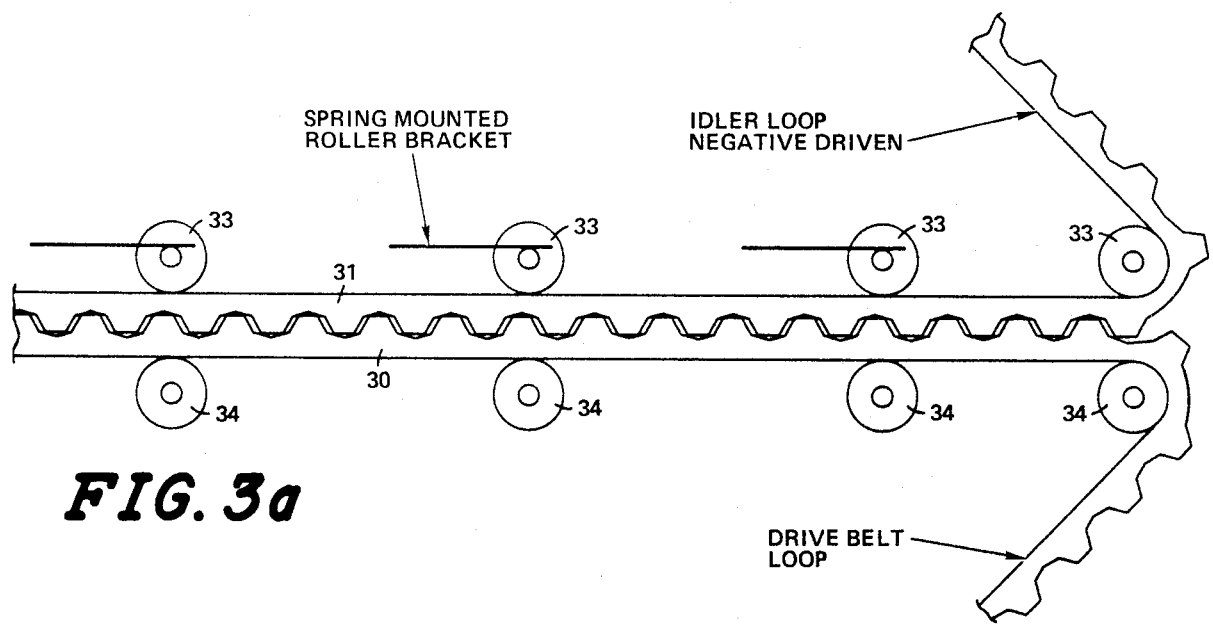
FIGS. 3a, 3b, and 3c illustrate the dual belts used in the transport.
Figure 3B:
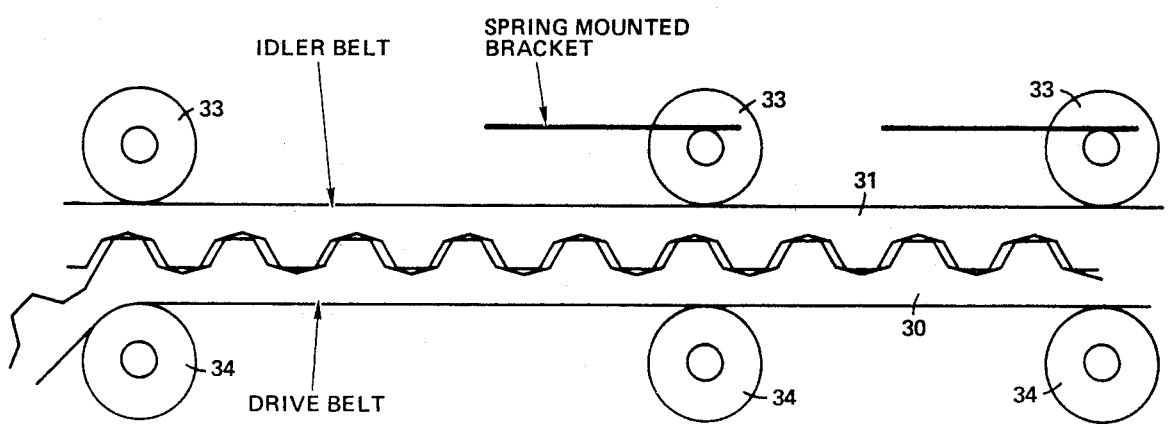
Figure 3C:
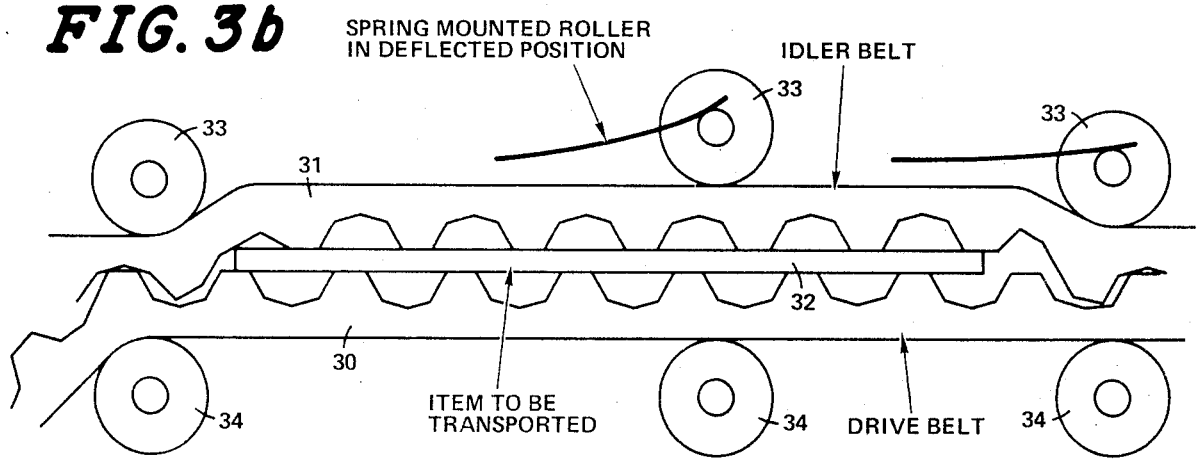

The transport belt path is comprised of two continuous belts 30 and 31 with interlocking teeth (See FIGS. 3a, 3b, and 3c). The teeth of the driver belt 30 (frame side) engage the sprocketed drive motor (FIG. 2) pulley and then loops through a set of rollers to present the teeth toward the idler belt 31 (jam release side). Tension settings for both belts are achieved at initial assembly by the spring loading tensioners.

The document 32 is held in place by the teeth at each end of the document which mesh together (see FIG.

3c). The drive belt moves the document as well as driving the idler belt.

The jam release is hinge mounted with two extension springs (not illustrated). The springs are stretched when the jam release is opened (30° maximum) to clear a jam. The jam release bottoms out on two locating stops that guarantee parallelism and proper belt meshing. Varying document thicknesses are accommodated by the spring loaded rollers 33 on the jam release side. The rollers 34 on the frame side are positioned on fixed shafts. A plastic deflector (described in copending Application Ser. No. 960,211, filed Nov. 13, 1978) is positioned above and below the belts to allow entering documents in while blocking exiting documents from going back into the feeder.

As the document is fed through the transport, the gate is sprung open by the document and the document passes between the diverter gate and a back plate. As soon as the trailing edge is passed, the diverter returns to a rest position with its end in a recess in the back plate. When the document direction is reversed, it is diverted and is directed into the document pocket.

A smaller plastic gate at the pinch roller holds the waiting document leading edge away from the reversing belt teeth thereby preventing paper chatter and possible document damage.

Having described a preferred embodiment of the invention, further embodiments and modifications will be suggested to those skilled in the art, which embodiments and modifications are deemed to be within the scope of the invention as defined in the following claims.

What is claimed is:

1. A reversible document transport wherein gear tooth type drive belts are used to engage each other and a document while the document is carried in a first then a second direction in the transport path past processing stations, comprising: a drive belt, an idler belt, first and second roller sets and a reversible drive means, said drive belt extending around said first roller set and driven by one roller which is attached to said drive means, said idler belt extending around said second roller set and having the gear teeth thereon engaging similar gear teeth on the drive belt, some of the rollers of the second roller set being spring biased holding the idler belt in contact with the drive belt and the document which is carried between the drive and idler belts maintaining the document in a fixed indexed position while it is moving from one processing station to another and until it is removed from the transport path while traveling in said second direction.

2. The system according to claim 1 wherein the spring mounted rollers of the second set of rollers deflect open in response to thick documents and return to a less deflected position for thinner documents.

3. The system according to claim 1 wherein the drive means has gear type teeth matching the teeth on the drive belt, and drives the belt in either a stepped or continuous mode in either direction.

4. The document transport according to claim 1 wherein the reversible drive means moves the drive belt in either stepped increments or continuous depending upon the desired mode of operation.

* * * * *